United States Patent

[11] 3,609,368

[72] Inventors: Jurgen Knorr, Dresden; Helmut Loffler, Dresden; Wolfgang Vogel, Weinbohla, all of Germany
[21] Appl. No.: 719,980
[22] Filed: Apr. 9, 1968
[45] Patented: Sept. 28, 1971
[73] Assignee: VEB Kabelwerk Oberspree (KWO) Berlin-Oberschoneweide, Germany

[54] APPARATUS AND METHOD FOR CHECKING THE DIAMETER OF ELONGATED STRUCTURES
15 Claims, 7 Drawing Figs.

[52] U.S. Cl. .................................................. 250/83.6, 250/83.3, 250/106
[51] Int. Cl. .................................................. G01t 1/18, G01n 23/02
[50] Field of Search .......................................... 250/83.3 D, 106 S, 83.6; 313/93

[56] References Cited
UNITED STATES PATENTS

| | | | |
|---|---|---|---|
| 2,875,364 | 2/1959 | Herzog | 313/93 |
| 2,899,582 | 8/1959 | Hermsen et al. | 313/93 |
| 2,922,884 | 1/1960 | Fearnside | 250/83.3 D X |
| 2,964,630 | 12/1960 | Bosch | 250/83.3 D X |
| 2,965,758 | 12/1960 | Malick | 250/106 S |
| 3,449,575 | 6/1969 | Smith | 250/106 S |

Primary Examiner—Archie R. Borchelt
Attorney—Tab T. Thein

ABSTRACT: Apparatus and method for checking the diameter of elongated structures, such as cables and insulated conductors, without contact and destruction, in a continuous manner, by passing the structure axially through an ionization device, providing radioactive radiation which impinges on the structure while it passes through the chamber, allowing the radiation to be weakened by its passage through the structure and to act upon electrode means also disposed in the chamber, and measuring the ionization current generated by the electrode means, the current being representative of the diameter of the structure as it passes through the device.

PATENTED SEP 28 1971 3,609,368

INVENTOR
JÜRGEN KNORR et al

BY *Jalo Hein*

AGENT

INVENTOR
JÜRGEN KNORR et al

BY *Jabthein*

AGENT

APPARATUS AND METHOD FOR CHECKING THE DIAMETER OF ELONGATED STRUCTURES

The invention relates to an apparatus and a method for the continuous, contactless and destruction-free checking or inspection of the diameter of elongated structures, such as cables, insulated conductors and the like. However, both the apparatus and the method are adapted for measuring or checking the outside diameter of tubes and other profiles, the type of material being immaterial.

It is known to measure the thickness of elongated structures, in particular of insulating sheaths of insulated conductors, by mechanical scanning by means of rollers. The result of the measurement is indicated on suitable instruments.

In another known method an X-ray tube, focused by means of a mask, is used as a source of rays. The elongated structure to be measured is passed between the ray source and a luminescent screen so that the structure is shown directly on said screen. To measure hose-shaped plastic structures in a contactless manner, it is further known to dispose an ionization chamber in the interior of the hose, and one or more emitters on the outside.

In another known method for the contactless measurement of diameters, the elongated structure to be checked or measured is located between a radioactive ray source and a radiation detector. The use of a diaphragm secures that the elongated structure is hit by an approximately parallel radioactive beam of rays only.

The known methods have a number of disadvantages. The mechanical scanning method has the disadvantage that the measurement is not contactless. When thermoplastic materials are involved in the elongated structures, particularly in cables and insulated conductors, deformations and injuries to the surfaces may occur. Since the measurement of the thermoplastic material can normally take place only after its solidification, there are long lapses between the indication of diameter fluctuations and the initiation of the regulating process. Therefore, for a certain manufacturing period, there is no assurance that the object or structure tested is actually to size. Beyond this, in checking the diameter of insulated, stranded conductors, considerable deviations in the indication of the measured values will occur because of the unavoidable stranding twist.

The known optical measuring methods for the inspection of the diameter of elongated structures have not been successful in practical application because the unavoidable dust, oil vapors and the like in the measuring section alone will lead to an uncontrollable distortion of the measuring results.

When reproducing the test piece on a luminescent screen by means of X-rays for purposes of diameter inspection, changes in the position of the tested structure may simulate a change in diameter at the measuring section. Moreover, the employment of X-ray apparatus for such purposes entails much expense in terms of installation and maintenance of the necessary apparatus.

The use of the method in which an ionization chamber is placed in the interior of the test piece to be measured, and emitters are disposed on the outside, is limited to the measurement of the wall thickness of hose-shaped structures and tubes. The method is not applicable to the continuous measurement of the diameter of cables and insulated conductors.

When using parallel rays of a radioactive source, positional changes of the structure under test cause the measured values to change so that clear information regarding the actual diameter of the elongated structure to be measured is not obtainable.

It is the object of the present invention to provide an apparatus and a method for the continuous, contactless and destruction-free checking and inspection of the diameter of elongated structures, solid or tubular, through which better supervision of the dimensional accuracy of the measured material or structure is assured while susceptibility to trouble is small.

The invention is based on the task of developing an apparatus and a method enabling the diameter of elongated structures to be inspected in a contactless and destruction-free manner, independently of the geometric position of the test piece.

According to important features of the invention, an annular ionization chamber and a preferably annular radioactive preparation or substance surround the elongated structure, whereby the intensity of the radiation emitted by the radioactive substance and oriented toward the elongated structure is weakened inside the structure, and the radiation intensity penetrating the sensitive volume of the ionization chamber generates an ionization current which represents a measure of the diameter of the elongated structure under measurement, and can be ascertained and even measured in a manner known per se.

The inventive apparatus preferably comprises an annular ionization device having a ray entry window at its inner side facing the elongated structure passing therethrough. The radioactive substance is so disposed as to enclose the structure completely.

According to another preferred embodiment of the apparatus, a rotating, punctiform or planar radioactive substance may also be used in place of the aforementioned annular substance.

Rotating along with the radioactive substance is, in the modified embodiment, a diaphragm or shield whose opening is opposite the substrate proper, but the shield otherwise covers up the ray entry window.

The apparatus and method according to the invention offer the advantage that the checking or inspecting installation can be set up in the immediate vicinity of the forming tools or machines, for instance, in the immediate vicinity of the nozzle of an extruder for sheathing cables. There is available, without time loss, as the initial value of the detection installation, an electrical signal which depends on the diameter of the elongated structure. The signal can be utilized for the continuous supervision and control of the manufacturing process.

The consequence thereof is a continuous inspection and regulation of the dimensional accuracy of the elongated structure which is being manufactured. Simultaneously with the qualitative improvement of the product associated therewith there results the possibility of automatic production of elongated structures. By dosing the material batch in an appropriate manner there result, moreover, savings in material so that elongated structures of the kind described hereinabove, such as cables and insulated conductors, among others, can be produced more profitably than heretofore. It is further possible to pick up several measuring points for the diameter control with one central detection installation or instrument.

Another advantage consists in that the apparatus according to the invention is sturdy, reliable and hardly needs any service or maintenance.

Other objects, features and many of the attendant advantages of the invention will be readily appreciated as the same becomes better understood by reference to the following detailed description, when considered with the accompanying drawings, wherein FIG. 1 is a vertical sectional view through a first exemplary embodiment of the inventive apparatus;

Figure 7:
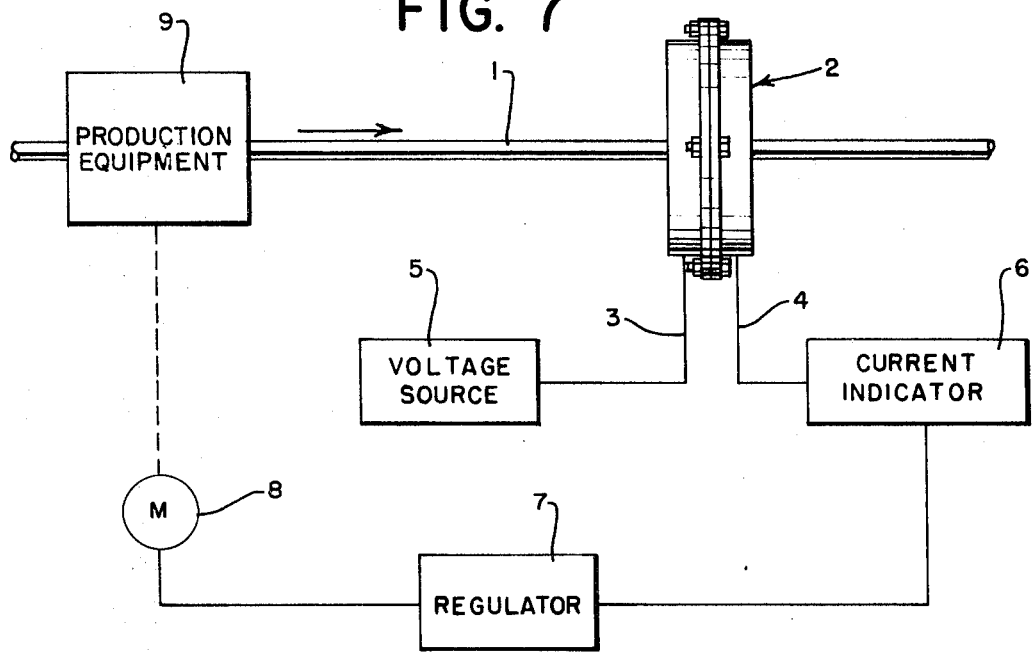
FIG. 7 shows a schematic outlay for a testing installation embodying the apparatus and method according to the invention for the automatic regulation of diameters of elongated structures.

Let us refer first to the schematic arrangement shown in FIG. 7, illustrating the method according to the invention for checking the diameter of elongated structures such as, for examples, cables, insulated conductors, tubes, hoses and the like. At 1 such a structure is schematically shown, passing in the direction of the arrow through and ionization chamber device 2 shown in a somewhat simplified side elevation. It will be understood that the preferred, exemplary embodiments of FIGS. 1 and 2, 3 and 4 as well as 5 and 6 illustrate respective devices 12, 32 and 52 which are of course compatible with an usable in the setup of FIG. 7. At 3 and 4, electrical connections are shown for electrodes within the chamber proper, to be described later in full detail. One of the conductors leads to a voltage source 5 while the other goes to a current indicator 6 or the like conventional instrument, preferably in series connection, as shown, with a regulating device 7 and control means 8, represented for the sake of simplicity by a conventional motor.

The latter acts on a production equipment 9, such as an extruder and the like from where the elongated structure 1 is fed toward the ionization chamber device 2, as shown. The electrical signal obtained at the output of the indicator 6 is fed to the regulator 7 which, is a known manner, can control the production equipment 9 so that a given nominal size for the diameter of the elongated structure 1 is maintained during the manufacturing process.

In an exemplary setup, the regulator 7 may consist of a control amplifier which transforms and amplifies the output value in such a manner that it can be compared with a preset nominal value. The deviation between the actually measured and the nominal value can be introduced into the control means 8 which, in turn, adjusts or regulates either the payout or discharge speed of the elongated structure 1 or the supply of plastic compound, or other material, so that a desired nominal diameter is maintained.

A reversible servomotor may, for example, be used for the control means 8, for controlling one of the parameters of the production equipment 9. The latter may represent an extruder, as mentioned before, or a wire drawing machine, a rolling mill, or the like equipment producing elongated structures of which the inventive apparatus and method checks and monitors the desired constant diameter. Further details of the outlay of FIG. 7 will not be required since they are not considered to form part of the inventive concept, and are well known to those skilled in various manufacturing arts.

Figure 1:
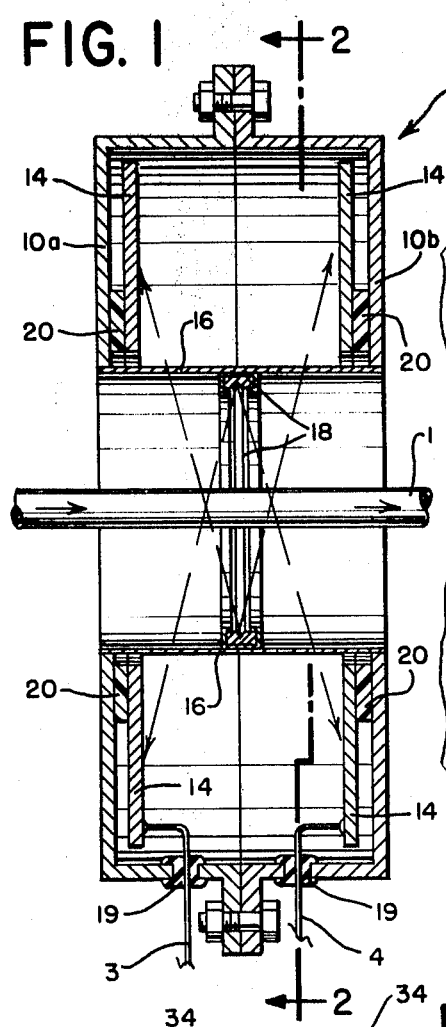
Figure 2:
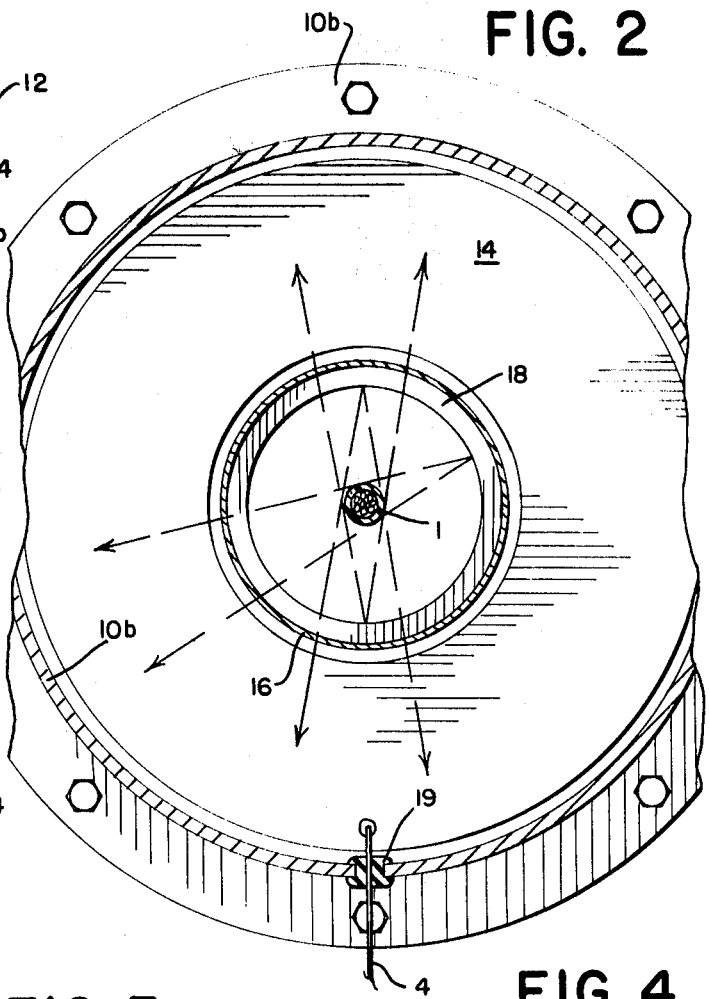
FIG. 2 is a partly sectional view taken along line 2—2 of FIG. 1.

We can now proceed to the description of the first exemplary embodiment as shown in FIGS. 1 and 2. The ionization chamber device is generally designated 12, preferably made of two half-shells 10a and 10b (also shown in FIG. 7), interconnected by bolts or the like conventional elements. The device is preferably of annular or disk shape, as shown in FIG. 2. Disk-shaped electrodes 14 are disposed within the shells 10a, 10b, in an outer annular space surrounding a ray entry window 16 which separates the inner space of the device into a central area for the passage of the elongated structure 1 and the preferably sealed outer annular area (which could be termed the ionization chamber proper, in which the electrodes 14 are secured. The outer annular area is preferably filled with an ionizable medium. The walls of the device may consist of any desired solid material. Preferably an aluminum foil is used for the window 16 between the two chamber spaces or areas.

An annular radioactive preparation or substance 18 is fastened in this embodiment, by means of an appropriate holder, to the inner side of the window 16 which faces the elongated structure 1 during its passage through the device 12 (as indicated by the arrow). Holding rings may, for example, be used for fastening the radioactive substance of this embodiment. It is advantageous for the distance of the substance from the lateral planes or walls to be the same; the substance 18 is preferably centrally disposed within the window 16. The symmetrical arrangement of the apparatus of FIGS. 1 and 2 ensures reliable readings during the passage of the structure 1, the radiation intensity being utilized to the maximum, which is of importance in view of the use of small activities of the substance, and for radiation protection.

It is nevertheless possible to dispose the annular radioactive substance 18 laterally in the device 12 or even outside of it (not shown).

At 19, insulator bushings are shown for the aforedescribed electrical connections 3 and 4 of the electrodes 14. Preferably but not necessarily insulating spacers or plates 20 can be provided within the walls 10a, 10b for holding the electrodes 14 in their predetermined position.

Figure 3:
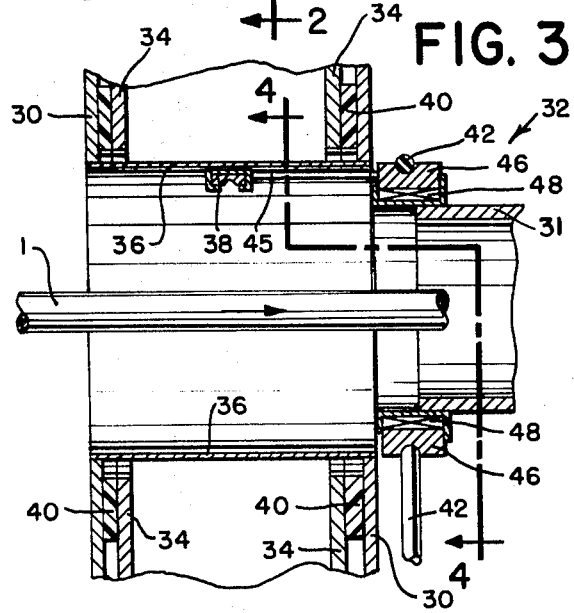
FIG. 3 is a partial sectional view through a second embodiment of the apparatus.
Figure 4:
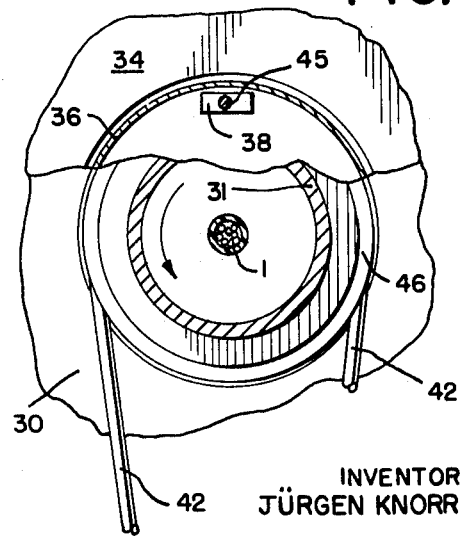
FIG. 4 is a partly sectional view taken along line 4—4 of FIG. 3.

In the second exemplary embodiment, as shown in FIGS. 3 and 4, some elements are similar to those already described for the previous apparatus embodiment. Thus, numeral 32 denotes the ionization chamber device in general; at 30, the walls or half-shells are shown; the electrodes in the outer annular area are at 34, the window is designated 36, and the spacers are shown at 40.

A tubular support member 31 carries a rotatable pulley 46 about which a belt or the like 42 is trained, adapted to be driven from a motor or other drive means. Pulley 46 may be guided about a bearing member 48. This structure serves to carry a rotatable radioactive substance, as shown at 38. The substance is preferably punctiform and is attached to the free end of a rod 45 held by the pulley 46. It will be clear from the figures that the radioactive substance is rotated about the elongated structure 1 which passes through the central area of the device 32.

Figure 5:
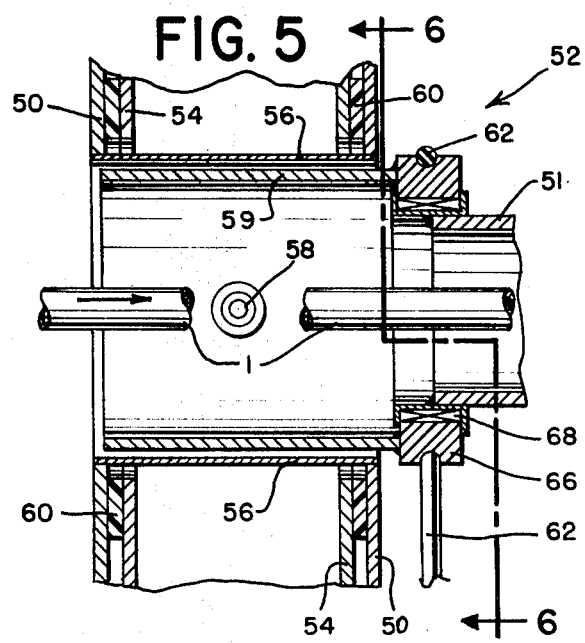
FIG. 5 is again a partial sectional view, similar to that of FIG. 3, through a third exemplary embodiment.
Figure 6:
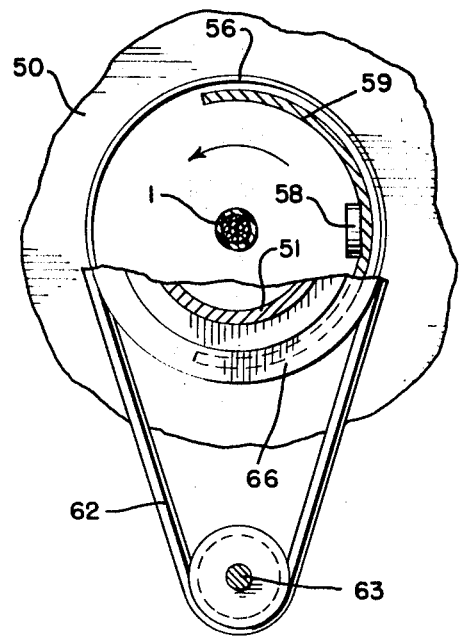
FIG. 6 is a partly sectional view taken along line 6—6 of FIG. 5.

Finally, the third embodiment shown in FIGS. 5 and 6 should be described wherein some of the structural elements are again similar to those described before. At 50, the walls of the third ionization chamber device 52 are shown; the above-described electrodes and window are at 54 and 56, respectively; spacers are illustrated at 60.

As in previous embodiment, a support member 51 is provided for the rotation of a pulley 66, driven by a belt 62; numeral 68 again denotes an intermediate bearing member for the pulley. In this embodiment (namely in FIG. 6), a driving shaft 63 is also shown with a pulley about which the belt 62 is guided for rotation of the radioactive substance about the elongated structure.

The substance of this embodiment is preferably planar, as shown at 58, and is attached substantially centrally to a shield or diaphragm 59, rigid with the pulley 66 and extending into the central chamber area, as shown. The opening of the shield is opposite the substance while the shield itself partly covers up the ray entry window 56. IN this manner, the relative changes in the ionization current are increased and, hence, the measuring sensitivity at a given relative change in diameter of the elongated structure 1 as compared to the embodiment without the shield or diaphragm. The same effect may be obtained with the aforementioned punctiform substance 38 of the preceding embodiment.

The radiation intensity penetrating from the sensitive volume of the ionization chamber device 12, 32 or 52, emanating as it does from the radioactive substance 18, 38 or 58, produces free charge carriers, due to the ionization action, which carriers are connected on the respective electrodes 14, 34 or 54.

When connecting the voltage source shown in FIG. 7, an ionization current flows through the system which is sensed by the indicator 6. Due to the shadow effect of the elongated structure 1 to be measured or checked, the radiation intensity which penetrates the ionization chamber device 2 (or its illustrated practical embodiments 12, 32 and 52) is weakened so that the amplitude of the ionization current represents a direct measure of the diameter of the elongated structure 1.

It is achieved by the symmetry of the arrangement that the ionization current of the device 2 depends solely on the diameter of the structure 1 but not on the specific position of the structure with respect to the device, so that changes in position occurring during the manufacturing process, or the passage of the structure through the device, remain without influence on the measured values.

It should be understood, of course, that the foregoing disclosure relates only to preferred embodiments of the invention and that it is intended to cover all changes and modifications of the examples described which do not constitute departures from the spirit and scope of the invention as set forth in the appended claims.

What We Claim Is:

1. An apparatus for checking the diameter of elongated structures, such as cables and insulated conductors, comprising, in combination, an ionization chamber device having a central area and an outer area constituting an ionization chamber, means allowing the movement of an elongated structure through said device in substantially central, axial direction, a radioactive substance disposed in outwardly spaced-apart relation to said central area, and electrode means disposed within said outer area in outwardly spaced-apart relation to the structure and said substance, for sensing the radiation which is not absorbed by the structure, owing to its shadow effect, said electrode means being adapted to generate an ionization current which is representative of the diameter of the structure as it is moved through said device.

2. The apparatus as defined in claim 1, wherein said outer area of the device is annular and said electrode means has an axis of symmetry which coincides with that of the structure.

3. The apparatus as defined in claim 1, wherein said radioactive substances is disposed closer to the structure than is said electrode means.

4. The apparatus as defined in claim 1, further comprising an ionizable medium in said outer area of the device, for lodging therein said electrode means.

5. The apparatus as defined in claim 4, wherein said outer area of the device is sealed from said central area, which latter accommodates said means allowing the movement of the structure as well as said substance.

6. The apparatus as defined in claim 5 further comprising window means between said central and said outer areas of the device, said window means limiting said central area in radial direction and allowing the radiation to pass therethrough in its way toward said electrode means.

7. The apparatus as defined in claim 6, wherein said radioactive substance is in annular form and surrounds the structure at a substantially central, stationary location in the proximity of said window means, thereby allowing integration of the entire cross-sectional area of the structure by radiation, perpendicular to the longitudinal axis of the structure.

8. The apparatus as defined in claim 6, further comprising means for rotating said radioactive substance concentrically about the structure, in the proximity of said window means.

9. The apparatus as defined in claim 8, wherein said substance is substantially punctiform and is rotated about the structure in a substantially central plane.

10. The apparatus as defined in claim 8, wherein said substance is substantially planar and is rotated about the structure in said central area of the device.

11. The apparatus as defined in claim 10, further comprising means for shielding said window means from the radiation emanating from said substances, said shield means being associated with said rotating means, and having an opening substantially opposite the location where said substance is secured to said rotating means.

12. The apparatus as defined in claim 8, wherein said rotating means includes a driven pulley rotatably mounted outside said device, and means attached to said pulley for carrying said substance for rotation in a substantially central plane.

13. The apparatus as defined in claim 12, wherein said carrying means is in the form of a rod which is substantially parallel to the structure and has said substance at its free end remote from said pulley.

14. The apparatus as defined in claim 12, wherein said carrying means is in the form of an arcuate member which partly surrounds the structure, has said substance substantially at its center, and constitutes a shield for said radiation emanating from the substance.

15. A method for continuously checking the diameter of elongated structures without contact and in a destruction-free manner, comprising the steps of moving an elongated structure in substantially axial direction through an ionization chamber device having a central area and an outer area constituting an ionization chamber; disposing a radioactive substance, in outwardly spaced-apart relation to said central area, so as to provide radioactive radiation within said device; allowing the radiation to impinge on the structure while it passes through said central area; making the radiation, which has not been absorbed by the structure, act upon electrode means disposed within said outer area in outwardly spaced-apart relation to the structure and said substance; and measuring an ionization current generated by said electrode means, said current being representative of the diameter of the structure, on account of the shadow effect of the latter, as it is moved through said device.

UNITED STATES PATENT OFFICE
CERTIFICATE OF CORRECTION

Patent No. 3,609,368　　　　　　　　Dated September 28, 1971

Inventor(s) Jürgen Knorr, et al

It is certified that error appears in the above-identified patent and that said Letters Patent are hereby corrected as shown below:

Column 5, line 27, and column 6, line 12 "substances", each occurrence, should read -- substance --. Column 5, line 45, before "radiation" insert -- the --.

Signed and sealed this 10th day of October 1972.

(SEAL)
Attest:

EDWARD M. FLETCHER, JR.　　　　　　ROBERT GOTTSCHALK
Attesting Officer　　　　　　　　　Commissioner of Patents